United States Patent [19]

Vaught

[11] 3,864,381

[45] Feb. 4, 1975

[54] RECOVERY OF DICYANOBUTENE FROM DICYANOBUTENE PROCESS BRINE

[75] Inventor: Alvin C. Vaught, Victoria, Tex.

[73] Assignee: E. I. du Pont de Nemours and Company, Wilmington, Del.

[22] Filed: Aug. 15, 1973

[21] Appl. No.: 388,649

[52] U.S. Cl. .................................. 260/465.8 R
[51] Int. Cl. .................................. C07c 121/20
[58] Field of Search .............................. 260/465.8 R

[56] References Cited
UNITED STATES PATENTS

| | | | |
|---|---|---|---|
| 2,477,573 | 8/1949 | Borcherdt | 260/465.8 R |
| 2,733,981 | 2/1956 | Mendolia | 260/465.8 R X |
| 2,841,537 | 7/1958 | Guyer et al. | 260/465.8 R X |
| 3,725,458 | 4/1973 | Starks | 260/465.1 |

Primary Examiner—Joseph P. Brust

[57] ABSTRACT

An improved process for recovering dicyanobutene from a process brine resulting from reaction of dichlorobutene with an aqueous solution of sodium cyanide which comprises contacting the brine with activated carbon to adsorb the dicyanobutene contained therein, removing the dicyanobutene from the activated carbon by treatment with an organic liquid and subjecting the activated carbon after dicyanobutene removal to treatment with steam at a temperature of 105° to 215° C. to remove residual organic liquid and to regenerate the carbon for subsequent adsorption.

6 Claims, No Drawings

RECOVERY OF DICYANOBUTENE FROM DICYANOBUTENE PROCESS BRINE

BACKGROUND OF THE INVENTION

This invention relates to recovery of dicyanobutene (DNB) from process brine resulting from the DNB manfacturing process.

In a widely used process for synthesizing DNB, an intermediate for the preparation of hexamethylene diamine which is useful in polyamide manufacture, by reaction of dichlorobutene with an aqueous solution of sodium cyanide in the presence of a copper-containing catalyst such as sodium cuprocyanide, a resulting byproduct is an aqueous brine containing small amounts of DNB which represents a loss in yield of desired product. It is known to reclaim organic materials from aqueous brine streams by contacting the brine stream with activated carbon such as a granular activated carbon bed wherein the organic material is adsorbed. After the loading cycle is complete the carbon must be regenerated in order to be reused in subsequent cycles. Steam stripping of the organic material, if it is sufficiently volatile, or thermal regeneration, for example, in an open fired multiple hearth furnace, are commonly used methods employed in the art for regenerating activated carbon beds.

The dicyanobutenes are not sufficiently volatile to permit regeneration of the adsorption bed by steam stripping. Thermal regeneration requires high equipment investment and moreover, regeneration by this technique entails high attrition of the activated carbon bed. Accordingly, a more efficient method of recovery of the desired dicyanobutenes is being sought.

SUMMARY OF THE INVENTION

An improved method has been found for recovering dicyanobutene (DNB) from activated carbon on which it is adsorbed. The method involves contacting the activated carbon on which the DNB is adsorbed with an organic liquid at a temperature in the range of about 20° C. to the boiling point of the organic liquid, wherein the DNB is desorbed from the activated carbon. Thereafter the activated carbon is subjected to treatment with steam at a temperature in the range of about 105° to 215° C., preferably 140°-150° C., which treatment removes residual organic liquid from the carbon and regenerates the carbon for subsequent use. The organic liquid containing desorbed DNB can be recycled to the DNB manufacturing process for reclaiming the DNB and organic liquid.

Organic liquids that can be used in the process of this invention are those which are steam distillable, which have a boiling point in the range of about 80° to 175° C., and in which the DNB is soluble to the extent of at least 1% by weight at 25° C. Preferred organic liquids are the aromatic hydrocarbons such as benzene, toluene, ortho-, meta- or paraxylenes, mesitylene or pseudocumene, other alkyl-substituted benzenes having a boiling point within the specified range and mixtures of the aforementioned hydrocarbons. Other organic liquids that can be used include aromatic and aliphatic halides such as chlorobenzene, ethylene dichloride, trichloroethylene, tetrachloroethylene or tetrachloroethane, and organic nitriles such as butyronitrile, valeronitrile or capronitrile. The amount of organic liquid used can be varied depending on the degree of recovery and regeneration desired. In general, at least 1 bed volume, and preferably 3 to 10 bed volumes, of liquid are used. Where a fixed carbon bed is employed the rate of flow can be in the range of 3 to 10 bed volumes per hour with 3 to 6 bed volumes being preferred.

The particular activated carbon employed will in general follow well known practices in the art. Activated carbon having a total surface area in the order of 1,000-1,100 $M^2$/gram in a mesh size of 20 × 50 to 12 × 28 is preferred. Especially suitable activated carbons include Grade LCK from Union Carbide Corporation, Pittsburgh CAL from Pittsburgh Activated Carbon Division, Calgon Corporation and Nuchar WVL from Westvaco Corporation.

The process of this invention provides a more efficient synthesis of dicyanobutene, a precursor to hexamethylenediamine for polyamide manufacture.

DESCRIPTION OF PREFERRED EMBODIMENTS

The process of this invention is further illustrated in the examples to follow. Concentration of DNB in the various streams was determined by gas chromatography.

The process brine used in the experiments described below was obtained from the processing steps of reacting dichlorobutene with an aqueous solution of sodium cyanide and sodium cuprocyanide catalyst. The aqueous phase from this reaction, containing about 21% brine, had been treated with hydrochloric acid to a pH of about 1.5 ± 0.5 to precipitate the major portion of the catalyst which was filtered. The acidified filtrate was further processed as described below.

EXAMPLE 1 — BATCH EXPERIMENT

Process brine was passed through a bed of activated carbon (LCK - Union Carbide Corporation) contained in a 2.9 × 13 cm glass column at a flow rate of 3 bed volumes per hour, at a temperature of 25° C. The loading cycle was terminated when the concentration of organic material (DNB) in the effluent reached 100 ppm, which level was reached when 22.5 bed volumes of brine had been passed through the activated carbon. Regeneration of the carbon was accomplished by passing 9 bed volumes of benzene through the carbon at a flow rate of 8 bed volumes per hour, followed by subjecting the bed to steam at 200° C. to remove residual benzene. In repeated loading cycles the 100 ppm DNB level in the effluent was reached on passage of 22.5 bed volumes of brine, indicating that adsorptive capacity of the bed was essentially being retained.

EXAMPLE 2 — CONTINUOUS SYSTEM

The process brine described above was fed at a temperature of about 25° C. to a 260 ml activated carbon bed (LCK) at a flow rate of 9 bed volumes per hour until the effluent from the bed showed a concentration of 100 ppm of DNB. Benzene was then passed through the loaded bed for two hours at a flow rate of 8 bed volumes per hour, following which the bed was steamed at 140° C. (25 psig bed pressure) to drive off residual benzene. After 45 cycles the activated carbon bed was determined by Freundlich isotherms to have retained approximately 75% of its original adsorptive capacity; there was no evidence of attrition of the activated carbon bed.

In a similar run to demonstrate further the extended life of the activated carbon using this technique of regeneration, process brine similar to that described above was fed to the adsorption unit at 7 bed volumes per hour for 3 hours, followed immediately by a One-half hour benzene treatment at 9 bed volumes per hour. A 30-minute steam flush at 25 psig (140° C.) completed the cycle. This sequence was repeated for 90 cycles. At the end of that time the carbon retained 70% of its original adsorptive capacity and no attrition of the carbon was observed.

I claim:
1. A process for recovering dicyanobutene from a process brine resulting from reaction of dichlorobutene with sodium cyanide and sodium cuprocyanide catalyst in an aqueous medium and acidification of the aqueous medium with hydrochloric acid to precipitate and reclaim the catalyst which comprises
   a. contacting the brine with granular activated carbon to adsorb dicyanobutene contained in the brine
   b. contacting the carbon on which the dicyanobutene is adsorbed with at least a volume equal to the granular activated carbon of a steam distillable organic liquid at a temperature in the range of about 20° C. to the boiling point of the organic liquid, the organic liquid having a boiling point in the range of about 80° to 175° C. and being one in which the dicyanobutene is soluble to the extent of at least one percent by weight at 25° C., to remove the adsorbed dicyanobutene from the carbon,
   c. separating the granular activated carbon from the organic liquid containing the dicyanobutene and
   d. recovering the dicyanobutene from the organic liquid.
2. The process of claim 1 wherein the organic liquid is an aromatic hydrocarbon of the group consisting of benzene, toluene, ortho-, meta- and paraxylenes and mixtures thereof.
3. The process of claim 2 wherein the hydrocarbon is benzene.
4. The process of claim 2 wherein the aromatic hydrocarbon containing dicyanobutene is recycled to the dicyanobutene process for recovery of the dicyanobutene and aromatic hydrocarbon.
5. The process of claim 1 wherein the carbon separated from the organic liquid is treated with steam at a temperature in the range of about 105° to 215° C. to remove the residual organic liquid and to regenerate the activated carbon for subsequent adsorption of dicyanobutene.
6. The process of claim 5 wherein the treatment with steam is carried out at a temperature in the range of 140°–150° C.

* * * * *